May 3, 1938. H. H. HOKE, JR Re. 20,713
COIN CONTROLLED MACHINE
Original Filed Nov. 25, 1936 6 Sheets-Sheet 1
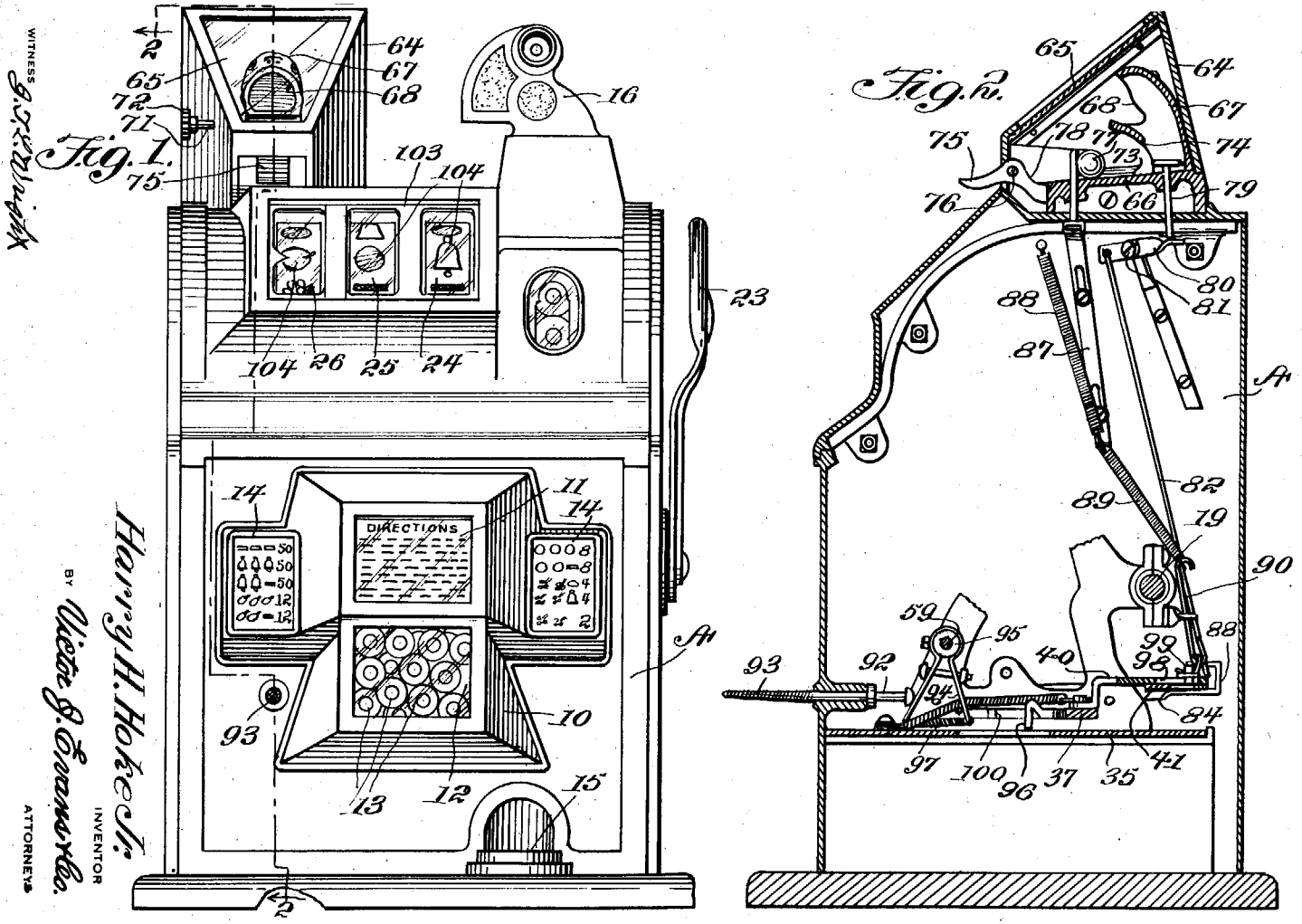

May 3, 1938. H. H. HOKE, JR Re. 20,713
COIN CONTROLLED MACHINE
Original Filed Nov. 25, 1936 6 Sheets-Sheet 2
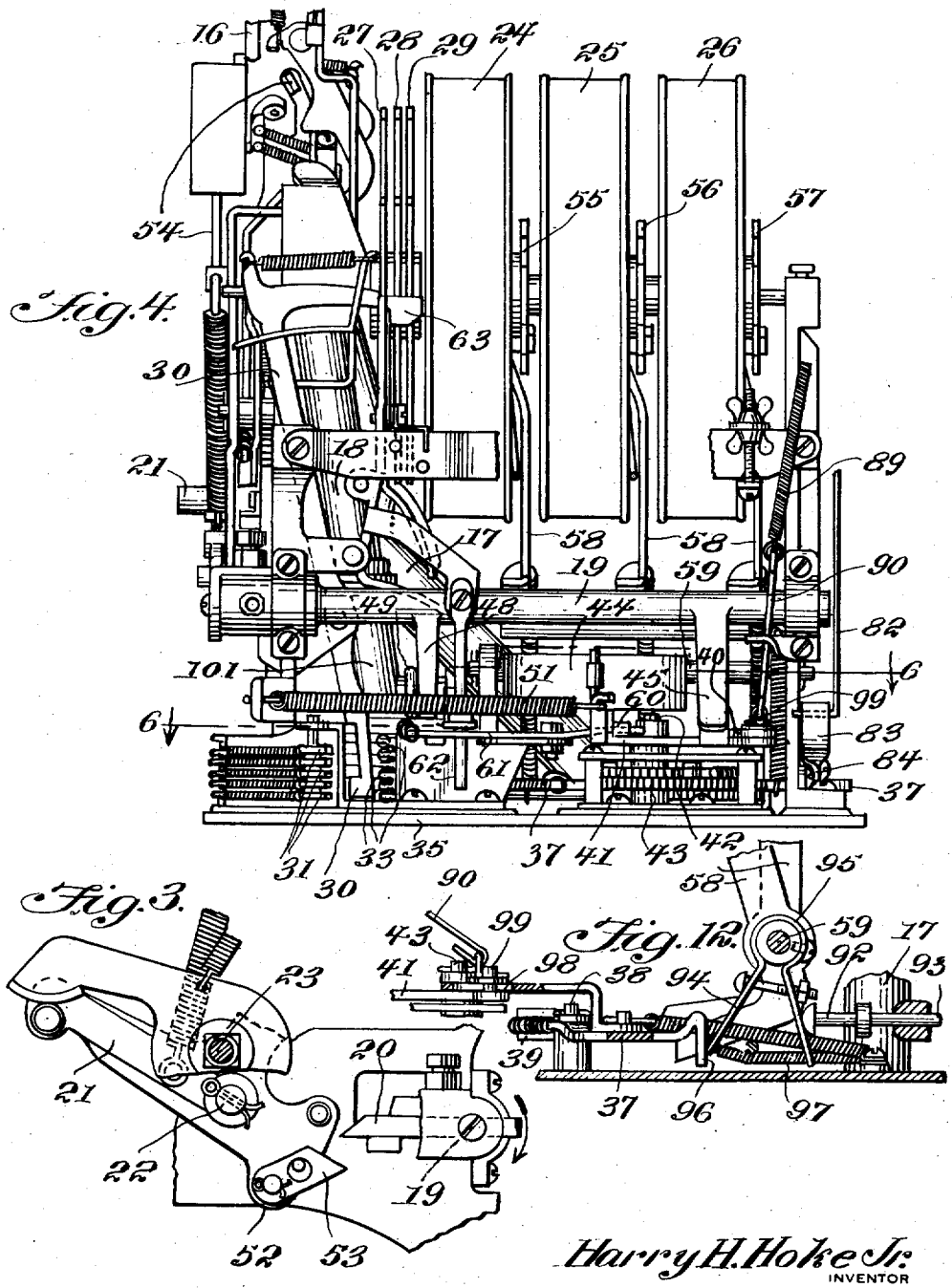
Harry H. Hoke Jr.
INVENTOR
BY Victor J. Evans & Co.
ATTORNEYS
WITNESS J. T. L. Wright May 3, 1938. H. H. HOKE, JR Re. 20,713
COIN CONTROLLED MACHINE
Original Filed Nov. 25, 1936 6 Sheets-Sheet 3
Fig. 5.
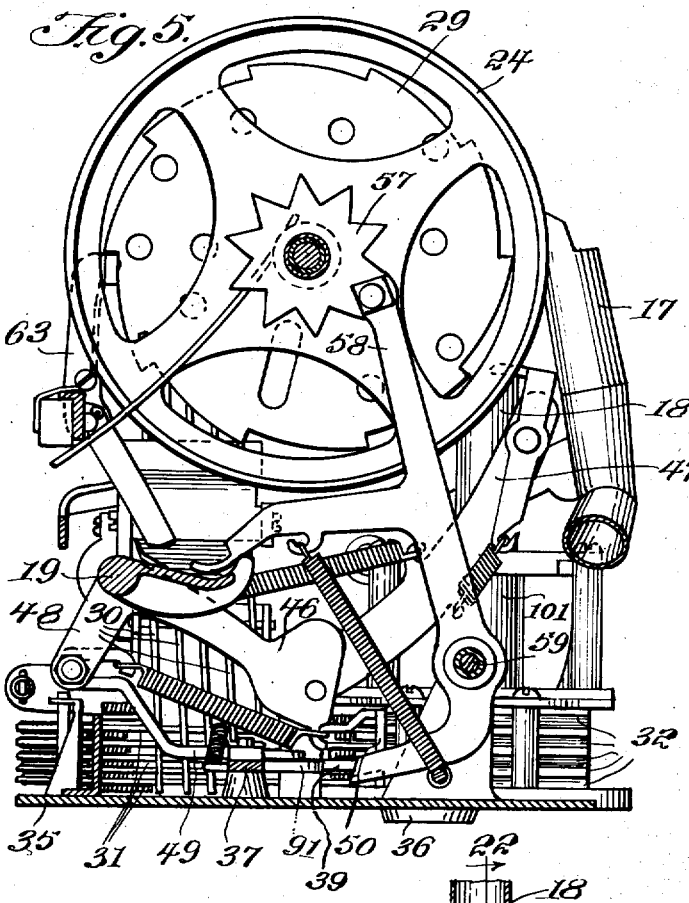
Fig. 21.
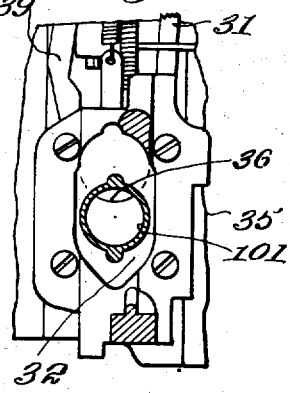
Fig. 20.
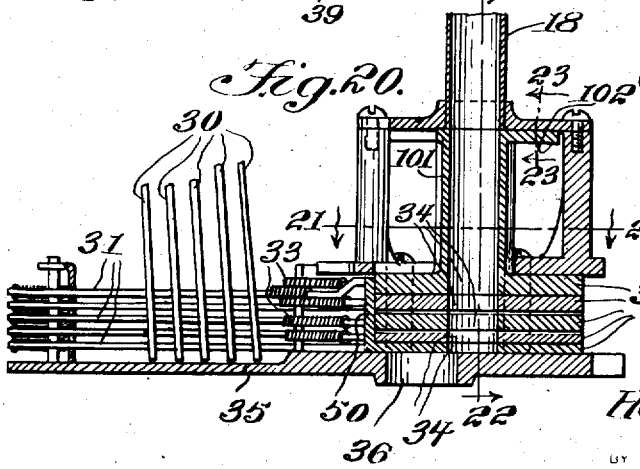
Fig. 22.
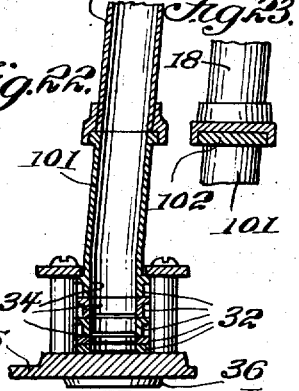
Fig. 23.
Harry H. Hoke Jr.
INVENTOR
BY Victor J. Evans & Co.
ATTORNEYS
WITNESS J. T. L. Wright May 3, 1938. H. H. HOKE, JR Re. 20,713
COIN CONTROLLED MACHINE
Original Filed Nov. 25, 1936 6 Sheets-Sheet 4
Fig. 6.
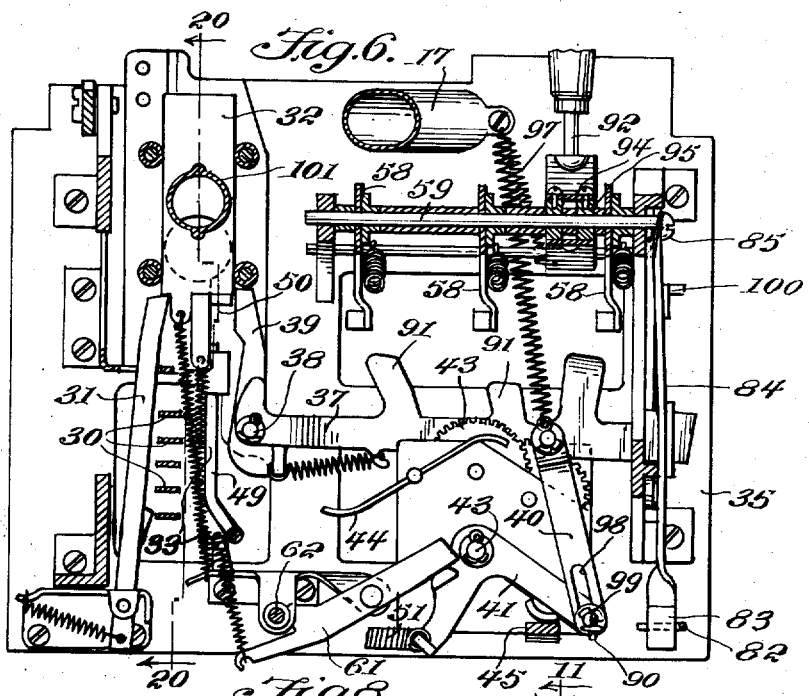
Fig. 8.
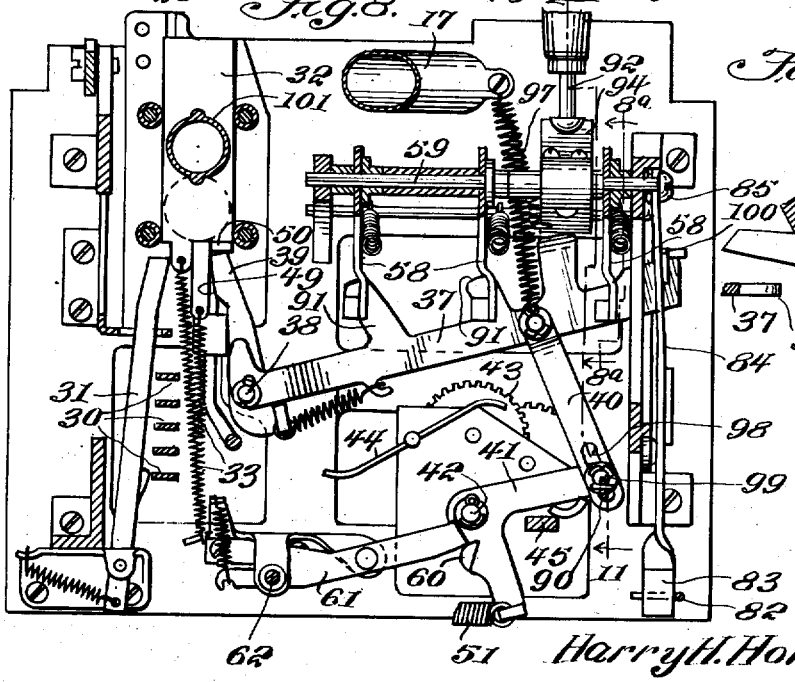
Fig. 8a.
Harry H. Hoke Jr.
INVENTOR
BY Victor J. Evans & Co.
ATTORNEYS
WITNESS J. L. Wright May 3, 1938. H. H. HOKE, JR Re. 20,713

COIN CONTROLLED MACHINE

Original Filed Nov. 25, 1936 6 Sheets-Sheet 5

Harry H. Hoke Jr.
INVENTOR

BY Victor J. Evans & Co.
ATTORNEYS

WITNESS J. T. L. Wright

May 3, 1938. H. H. HOKE, JR Re. 20,713
COIN CONTROLLED MACHINE
Original Filed Nov. 25, 1936 6 Sheets-Sheet 6
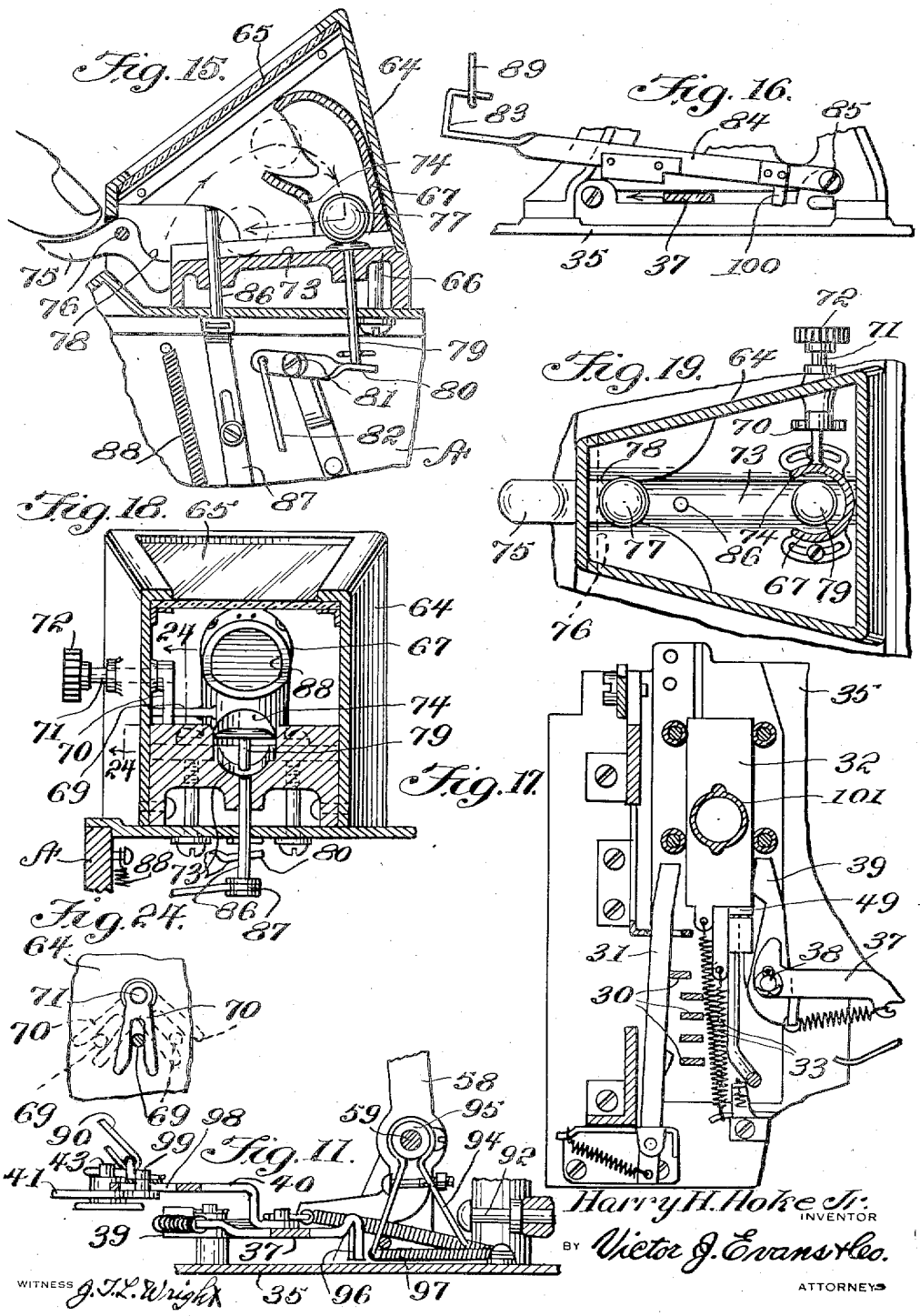
Harry H. Hoke Jr.
INVENTOR
BY Victor J. Evans & Co.
ATTORNEYS
WITNESS J. T. L. Wright Reissued May 3, 1938 Re. 20,713

UNITED STATES PATENT OFFICE 20,713

COIN CONTROLLED MACHINE

Harry H. Hoke, Jr., Washington, D. C.

Original No. 2,102,532, dated December 14, 1937, Serial No. 112,818, November 25, 1936. Application for reissue January 20, 1938, Serial No. 185,970

14 Claims. (Cl. 273—95)

The invention relates to a coin controlled machine for vending purposes.

The primary object of the invention is the provision of a machine of this character, wherein the same involves refinements over the subject matter of United States Letters Patent, Numbers 1,586,455 and 1,697,537 issued on or about May 25, 1926 and January 1, 1929, respectively, and is equipped with an object throwing device such as a ball or the like which controls the final operation of the machine before a payout may be had therefrom should an operator win the latter and also a manually operated device for stopping the legend-displaying wheels from rotation at the will of the operator of said machine thereby enhancing the chances of a payout by the latter.

A further object of the invention is the provision of a machine of this character, wherein the object throwing device involves the representation of an animated thing, for example, a snake with an open mouth for the catching of the object when thrown while the device for the stopping of the legend-displaying wheels is imitative of the tail of the thing which lends amusement and attractiveness to the machine.

A still further object of the invention is the provision of a machine of this character, which is comparatively simple in its construction, thoroughly reliable and efficient in its operation, affording deep interest to an operator or player thereof and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a front elevation of the machine constructed in accordance with the invention.

Figure 2 is a fragmentary sectional view taken approximately on the line 2—2 of Figure 1.

Figure 3 is a fragmentary elevation partly in section of the operating mechanism of the machine.

Figure 4 is a rear elevation with portions thereof broken away and the casing removed.

Figure 5 is a vertical transverse sectional view through the machine, the casing being removed.

Figure 6 is a sectional view on the line 6—6 of Figure 4 looking in the direction of the arrows.

Figure 7 is a fragmentary side elevation of the ball release and ball actuated mechanisms of the machine.

Figure 8 is a view similar to Figure 6 showing certain of the parts thereof shifted during a stage in the operation of the machine.

Figure 8a is a sectional view on the line 8a—8a of Figure 8 looking in the direction of the arrows and certain parts being omitted.

Figure 9 is a view similar to Figure 7 with the parts thereof in a shifted position.

Figure 11 is a fragmentary sectional view on the line 11—11 of Figure 8 and with certain parts omitted.

Figure 12 is a view similar to Figure 11 showing the parts in a shifted position.

Figure 14 is a view similar to Figures 7 and 9 with the parts in a different position.

Figure 15 is a view similar to Figure 10 with the parts in a shifted position.

Figure 16 is a view similar to Figure 14, the parts being further shifted.

Figure 17 is a fragmentary plan view showing certain of the parts in Figure 13 in a shifted position.

Figure 18 is a sectional view on the line 18—18 of Figure 10 looking in the direction of the arrows.

Figure 19 is a sectional view on the line 19—19 of Figure 10 looking in the direction of the arrows.

Figure 20 is a sectional view on the line 20—20 of Figure 6.

Figure 21 is a sectional view on the line 21—21 of Figure 20 looking in the direction of the arrows.

Figure 22 is a sectional view on the line 22—22 of Figure 20.

Figure 23 is a sectional view on the line 23—23 of Figure 20.

Figure 24 is a sectional view on the line 24—24 of Figure 18.

Similar reference characters indicate corresponding parts throughout the several views in the drawings.

Figures 10, 13:
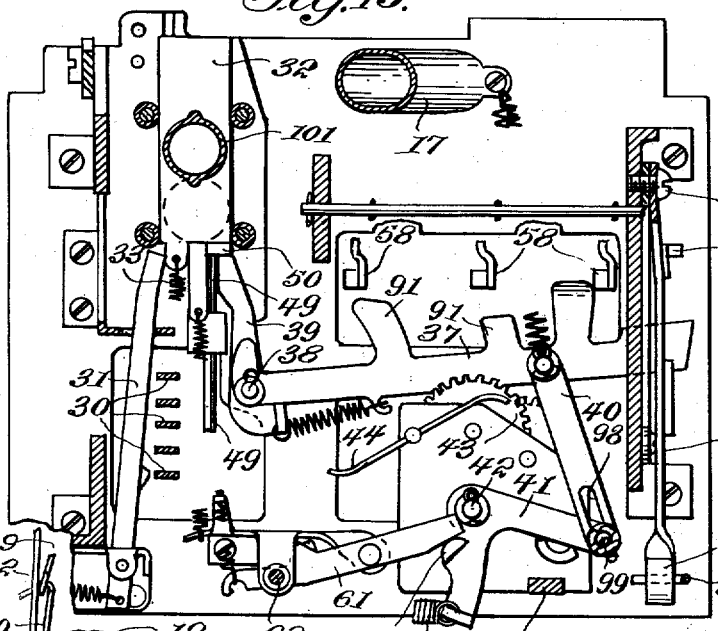
Figure 10 is a fragmentary vertical transverse sectional view through the ball enclosure.
Figure 13 is a horizontal sectional view showing certain of the parts in Figures 6 and 8 in a shifted position.

Referring to the drawings in detail, the machine comprises a main casing A which is equipped at its front with an out-struck area 10 having therein glass paneled spaces or chambers 11 and 12, respectively. The chamber 11 carries a placard displaying instructions thereon for the operation of the machine while the space 12 displays tokens 13 representative of the award from the machine. Additionally, at opposite sides of this area 10 are frames 14 on which are displayed symbols and numerals, these symbols under the combinations of display thereof are indicative of the pay-out of the machine in conformity with the numerals exhibited in this display. At the front of the casing A next to the bottom thereof is an open tray or trough 15 which is adapted to receive the pay-out from the machine to be acquired by the operator thereof.

Within the casing A is the vending mechanism involving legend-displaying reels and the coin controlled mechanism. The mechanism is provided with a coin chute 16 through which coins may be passed to a tube 17 which may lead to a cash box (not shown). The mechanism is further provided with a pay-out magazine 18 which may be charged with tokens or other pay-out pieces in any suitable manner.

For the purpose of the present application it will be unnecessary to explain the machine in its entirety and the accompanying drawings illustrate only sufficient portions of the mechanism to enable the present invention to be understood.

The mechanism interiorly of the casing A is equipped with a main transverse rock shaft 19 which has secured near one end thereof an actuating arm 20. A main actuating arm 21 of the mechanism is journaled on a pivot 22. The arm 21 is adapted to be actuated by a lever 23 mounted on the casing of the machine. This arm 21 can only be actuated to turn the rock shaft 19 when a coin or the like is employed to release a suitable locking device (not shown).

The mechanism is equipped with a series of legend-displaying reels 24, 25, and 26 which are provided with telescoping tubular shafts equipped, respectively, with ratchet disks 27, 28, and 29 in a known manner. Coacting with the ratchet disks is a series of levers 30 which control, in a known manner, a series of locking levers 31.

The slide locking levers 31 control the retraction of the pay-out slides 32 in a known manner, it being understood that the pay-out slides are drawn rearwardly by springs 33 when the locking levers are released from engagement with the slide.

The slides 32 are provided with perforations 34 which normally register with the lower end of the magazine 18 so that these perforations will accommodate or contain the tokens or the like placed within the said magazine 18. The bottom plate 35 of the frame of the mechanism is provided with a discharge passage 36 into registration with which the perforations 34 may come when the slides are retracted by the springs 33. The passage 36 opens directly into a lead (not shown) communicative with the tray or trough 15. A lever 37 is arranged above the bottom plate 35 and is connected with a pivot 38 which also supports a bell crank lever 39 serving to engage the pay-out slides 32 in their forward position. This lever 39 serves to hold the slides 32 slightly beyond the position shown in Figure 6 of the drawings thus relieving the pressure on the ends of the locking levers 31 so that the throw-out levers 30 (when permitted to act by the disks 27, 28 and 29) may easily disengage the locking levers from the slide. Just before the end of the cycle of operations, the lever 39 is withdrawn from engagement with the slides. The lever 37 is connected by a link 40 with a lever 41 which is rigidly fixed to a shaft 42 of a gear train 43 which gear train serves to actuate a regulating vein 44 in a well known manner. The lever 41 is adapted to be actuated by an arm 45 carried by the rock shaft 19 in a known manner.

The rock shaft 19 has formed therewith a bell crank lever 46, one arm of which has connected with it a device 47 for actuating the reels in a known manner. The lever 46 has a short arm 48 with which is connected a device 49 which serves to move the pay-out slides forward to their normal position, the front end of the device 49 being adapted to engage an upstanding arm 50 with which the lower pay-out slide is equipped and which is adapted to abut against the rear ends of the superposed pay-out slides. A spring 51 serves to return the lever 41 to the position shown in Figure 6 of the drawings, this being the normal position of rest. In this position the bell crank lever 39 is disengaged from the pay-out slides 32 and the pay-out slides are free to be drawn rearwardly by their springs 33 when permitted by the locking levers 31. The arm 21 which is actuated by the operating lever 23 carried by the side wall of the casing A has an extension 52 upon which is mounted a pawl 53 which is adapted to engage the arm 20 of the rocking shaft 19 and thus turn the said shaft in the direction indicated by the arrow in Figure 3 of the drawings when the machine is actuated.

As shown in Figure 4 of the drawings the lever 54 is employed to force the coins downwardly through the coin chute and effect release of the locking device (not shown) which normally locks the mechanism, the lever 54 being actuated from the arm 21 in a well known manner.

The reels are shown equipped with star wheels 55, 56 and 57 which are adapted to be engaged by locking pawls 58 mounted on a rock shaft 59. This device is of well known construction.

The bell crank lever 41 is equipped with a cam stud 60 which engages one end of a lever 61 which in turn engages a release pin 62 of a release device for the levers 30. Cooperating with the release device for the levers 30 is a release device 63 for the ratchet disks 27, 28, and 29, these devices operating in the well known manner.

Built upon the casing A at its top is an object throwing device which comprises a forwardly tapered housing 64 having a forwardly inclined glass paneled window 65 while interiorly of this housing and rising from its bottom 66 close to the rear wall of said housing is an image head 67, in this instance indicative of the head of a snake having an open mouth 68 forwardly directed. The head 67 is rotatably supported in an upright position and is formed with a lateral tine 69 loosely held engaged in a forked lever 70 fixed to a horizontally disposed stud shaft 71 journaled in the outer side wall of the housing 64 to extend exteriorly of the latter. On the exterior end of the shaft 71 is a knurled knob 72 to be hand operated for the turning of the said head 67 when it is desired to rotatably adjust the same. Formed in the bottom 66 of the housing 64 is a forwardly inclined raceway 73 leading from a discharge opening 74 in the front of the head 67 below its open mouth 68 to a finger operated trigger 75 pivoted at 76 and projected outside of the said housing 64 at its front. This trigger 75 receives from the raceway 73 an object, such as a ball 77, and when the latter is within the seat 78 in the said trigger 75 on depressing the said trigger by the finger of the hand of an operator the ball 77 can be projected or thrown for the catching thereof in the open mouth 68 of the head 67. Working through the bottom 66 of the housing 64 within the head 67 is a depressible treadle 79 which by the weight of the ball 77 when contacting therewith will depress said treadle. By reason of the fact that the trigger 75 can be manipulated for fast or slow rocking movement in the throwing of the ball 77 such movement causes the ball to swerve from a straight throw with liability that the same can not enter the head 67 through the open mouth 68 thereof. This head 67, therefore, is susceptible of adjustability in a lateral direction in that such ball under the speed of throw thereof laterally swerves from right to left and in this manner the open mouth can be positioned for a possible catch of the said ball. This treadle 79 engages a rock arm 80 pivoted at 81 and has connected therewith a link 82 which depends within the casing A to be separably engaged by a hook terminal 83 of a latching arm 84 pivoted at 85 to the frame of the mechanism of the machine. This arm 84 is adapted for engagement with the lever 37 to stay the movement thereof and prevent each complete cycle of operation of the machine until the arm 84 is actuated and releases said lever 37. The release of the lever 37 by the arm 34 is had when a ball has been caught in the open mouth 68 of the head 67 and makes contact with the treadle 79, the weight of the ball 77 depressing the said treadle 79 for such purpose.

Movable through the bottom 66 of the housing 64 to intersect the raceway 73 in said bottom is a stop pin 86 carried by a slide 87 to which is connected a coiled retractile spring 88 which functions to project the stop pin 86 at a determined time in the cycle of operation of the machine in the raceway 73 to hold back the progress of the ball 77 from reaching the trigger 75 after such ball has been discharged through the opening 74 from the head 67 within the housing 64. The slide has connected thereto an actuating spring 89 which through a link 90 is connected to the lever 41 so that on movement of this lever in one direction the stop pin 68 will be caused to shift for allowing the ball 77 to travel onto the trigger 75 and on reverse movement of the lever 41 the spring 88 becomes active for the raising of the pin to a stopping position in the raceway 73 to effect a barrier to the ball 77 and prevent the deposit thereof in the seat 78 in the trigger 75 when discharged from the head 67 after depressing the treadle 79 and gaining access thereto through the open mouth 68 of the head 67.

It will be understood that a completed cycle of each operation of the machine can not take place until the treadle 79 has been depressed by the weight of the ball 77 when making contact therewith on the throwing of the ball by the trigger 75 through the open mouth 68 and within the head 67 so that a pay-out by the machine will not occur should a pay-out have been won until a completed cycle of operation of the machine is had.

The lever 37 is formed with a series of varying lengthened horns 91, these coacting with the pawls 58 together with said lever 37 to permit the operation thereof and their coacting with the star wheels 55 for the stopping of the reels 24, 25 and 26 when rotated. The pawls 58 when released from the star wheels 55 ride the horns 91 and engage with the star wheels 55 for the stopping of the said reels.

Movably supported horizontally in the frame of the mechanism and the casing A carrying the same is a push plunger 92, its outer end being projected outside of the casing A at the front and is formed with a push terminal 93 imitative of the tail of a snake to be manually operated. The opposite inner end of the push plunger 92 is adapted to engage with a cushioning device 94 loosely hinged at 95 and engageable with an abutment ear 96 bent downwardly from the lever 37, the device 94 being urged by a spring 97 in a direction to project the plunger 92 in a normal position to have the terminal 93 projected from the front of the casing A so that such plunger 92 can be manually moved inwardly, either quickly or slowly, and on such inward movement the device 94 will act upon the lever 37 to accelerate its speed of travel over that effected by the lever 41 until this lever 37 is latched by the arm 84 which stops the completing of the cycle of operation of the machine until such arm 84 has released the said lever 37. The purpose of accelerating the movement of the lever 37 is to effect the stopping of the reels 24, 25, and 26 when rotating by the cycle of operation of the machine and in this manner enabling an operator of the machine to arrive at a setting of such reels for accomplishing a pay-out by the machine.

To allow the acceleration in movement of the lever 37 the link 40 is provided with an elongated slot 98 for the pivot 99 connecting said link 40 with the lever 41 and this slot 98 is of an extent limiting the accelerating movement of the said lever 37 over that effected by the lever 41 thereon.

The arm 84 is formed with a stop ear 100 in the path of the lever 37 which limits the movement of this lever in one direction, that is to say, in the direction for the riding of the pawls 58 upon the horns 91 of said lever 37.

The uppermost pay-out slide 32 at the perforation 34 therein for the article to be vended is formed with a magazine 101 for increasing the number of tokens or other pay-out so that when this slide 32 is liberated together with the other slides for vending purposes a maximum pay-out will occur while the lowermost slide when operating for a pay-out will discharge the minimum pay-out. Then when this lowermost slide cooperates with the next uppermost slide thereto a double pay-out of twice that had by the lowermost slide will occur. Then when the next uppermost slide coacts with those slides lowermost thereto an increased pay-out will be had. In other words, when the lowermost slide effects a pay-out in this instance two tokens will be delivered. The next uppermost slide thereto when operating for a pay-out in conjunction with the lowermost slide delivers four tokens. Now when the next uppermost slide together with the lowermost slides effects a pay-out eight tokens will be delivered while another uppermost slide effects a pay-out of twelve tokens and the magazine 101 when effecting a pay-out in conjunction with all of the other lowermost slides will deliver fifty tokens from the machine.

The magazine 101 at the uppermost end thereof next to the magazine 18 is formed with a cut-off shutter 102 so that when a maximum pay-out is effected by the machine the shutter 102 moves across the magazine 18 and thus precludes the falling of the contents of this magazine 18 therefrom until the magazine 101 by the return of the uppermost slide to normal position comes into communication with said magazine 18 whence the magazine 101 will be replenished or refilled, being also, of course, understood that the slide lowermost to the uppermost slide when returning to normal position will be filled through the magazine 101.

The casing at its front is provided with a glass paneled opening 103 enabling visibility of the display matter such as symbols 104 or the like upon the reels 24, 25 and 26 and thereby giving knowledge to the operator of the machine under each cycle of operation of the same whether or not a pay-out will be had by such machine.

In the operation of the machine when a token or the like is inserted in the coin controlled mechanism and the vending mechanism set into action should a pay-out be arrived at on the rotation of the reels 24, 25, and 26 before such pay-out can be had it is necessary for the operator to actuate the trigger 75 with a ball in the seat 78 therein so that this ball will be thrown and when received in the open mouth 68 in the head 67 within the housing 64 the depressing of the treadle 79 will occur which releases the arm 84 from the lever 37 and thus a completed cycle of operation of the machine will be had otherwise not. Now during the cycle of operation of the mechanism, should the operator feel that he can arrive at a pay-out by stopping the rotating reels 24, 25, and 26 through such partially completed cycle of operation, the said operator will be required to push the plunger 92 inwardly causing an acceleration in the movement of the lever 37 beyond that given to it by the lever 41 and before the said lever 37 is locked by the arm 84. This acceleration results in the riding off of the pawls 58 from the horns 91 on said lever 37 to have such pawls lock with the star wheels 55 and thus stopping the rotation of the reels 24, 25, and 26 which enables a possible arrival at a pay-out period of each cycle of operation of the machine, being, of course, understood that a completed cycle of operation to be arrived at such operator of the machine must actuate the throwing device by working the trigger 75 and project the ball 77 therefrom into the mouth 68 of the head 67 to have the weight of the ball within this head depress the treadle 79 for the purposes hereinbefore set forth.

Should an operator feel that it is necessary to adjust the head 67 to have the open mouth 68 more accurate to the path of the throw of the ball 77, then the knob 72 must be actuated for the adjustment of the head 67 within the enclosure 64.

From the foregoing it is thought that the construction and manner of operation of the machine will be clearly understood because the coin controlled mechanism and the vending mechanism embodied therein with certain exceptions as above delineated are disclosed in United States Letters Patent, Numbers 1,586,455 and 1,697,537, respectively, so for this reason a more extended explanation has been omitted.

What is claimed is:

1. In a machine of the kind described, vending mechanism having a plurality of rotary driven display reels, motive means for rotating the reels, manually operated means for stopping the rotation of the reels during a cycle of operation of the said mechanism, means for staying the completion of the cycle of operation of the said mechanism, a ball-throwing device manually actuated for releasing the third-named means, and an adjustable image for receiving and directing a ball for said device into position for releasing the third-named means.

2. In a machine of the character described, vending mechanism having a clock-operated bar for controlling said mechanism, manually operated means for accelerating motion of the clock-operated bar, a ball-throwing device for controlling activity of the clock bar, and an adjustable image for receiving and directing a ball of the said device into position for activity thereof in effecting the release of the clock bar.

3. In a machine of the character described, vending mechanism having a clock-operated bar for controlling said mechanism, manually operated means for accelerating motion of the clock-operated bar, a ball-throwing device for controlling activity of the clock bar, an adjustable image for receiving and directing a ball of the said device into position for activity thereof in effecting the release of the clock bar, and a finger-operated ball-throwing trigger included in said device.

4. In a machine of the character described, vending mechanism, controlled means for effecting a cycle of operation of said mechanism, manually operated means for stalling the operation of said mechanism during its cycle of operation thereof, a visible adjustable image, mechanism within the image for the releasing of said first-named means, and manually controlled means adapted to be directed toward and received by the image for effecting the operation of the last-named means.

5. In a machine of the character described, vending mechanism, controlled means for effecting a cycle of operation of said mechanism, manually operated means for stalling the operation of said mechanism during its cycle of operation thereof, a visible adjustable image, mechanism within the image for the releasing of said first-named means, manually controlled means adapted to be directed toward and received by the image for effecting the operation of the last-named means, and means for adjusting the image.

6. In a machine of the character described, vending mechanism, a clock-operated bar controlling said mechanism, means for arresting movement of the clock-operated bar prior to completion of its cycle of operation, a releasing device for the last-said means, and a ball-throwing device dependent on the skill of the user for the actuation of the releasing device.

7. In a machine of the character described, vending mechanism, a clock-operated bar controlling said mechanism, means for arresting movement of the clock-operated bar prior to completion of its cycle of operation, a ball-actuated releasing device for the last-said means, and a ball-throwing device for casting a ball at said releasing device for actuation of the latter.

8. In a machine of the character described, vending mechanism, a clock-operated bar controlling said mechanism, means for arresting movement of the clock-operated bar prior to completion of its cycle of operation, and means for releasing the arresting means and embodying a ball-throwing device, a ball-tripped device and a ball to be cast by the former at the latter.

9. In a machine of the character described, vending mechanism, a clock bar controlling said mechanism, means for arresting movement of the clock-operated bar prior to completion of its cycle of operation, operator actuated means for accelerating the clock bar at a faster rate than its normal operation to advance the time of engagement with the arresting means, a releasing device for the arresting means, and an operator actuated device for tripping the releasing device and dependent on the skill of the user for its successful function.

10. In a machine of the character described, vending mechanism, a clock-operated bar controlling said mechanism, means for arresting movement of the clock-operated bar prior to completion of its cycle of operation, means for releasing said arresting means, and a projectile to be projected by the operator at the releasing means.

11. In a machine of the character described, vending mechanism, a clock-operated bar controlling said mechanism, means for arresting movement of the clock-operated bar prior to completion of its cycle of operation, a releasing device for the last said means, a ball, a throwing device for the ball, and a housing enclosing the ball and in which the ball may traverse erratic paths, the housing having a defined path of movement for the ball in which path said releasing device is disposed.

12. In a machine of the character described, vending mechanism, a clock-operated bar controlling said mechanism, means for arresting movement of the clock-operated bar prior to completion of its cycle of operation, a releasing device for the last said means, a ball, a throwing device for the ball, a housing enclosing the ball and in which the ball may traverse erratic paths, the housing having a defined path of movement for the ball in which path said releasing device is disposed, and a retractible stop pin disposed in said path between the releasing device and the throwing device.

13. In a machine of the character described, vending mechanism, a clock-operated bar controlling said mechanism, means for arresting movement of the clock-operated bar prior to completion of its cycle of operation, a releasing device for the last said means, a ball, a throwing device for the ball, a housing enclosing the ball and in which the ball may traverse erratic paths, the housing having a defined path of movement for the ball in which path said releasing device is disposed, and a retractible stop pin disposed in said path between the releasing device and the throwing device, said pin being clock-operated to be retracted from and promptly returned to its ball obstructing position on the inception of the movement of the clock bar.

14. In a machine of the character described, vending mechanism, a clock bar controlling said mechanism, means for arresting movement of the clock-operated bar prior to completion of its cycle of operation, operator actuated means for accelerating the clock bar at a faster rate than its normal operation to advance the time of engagement with the arresting means, a releasing device for the arresting means, a ball throwing member, and a ball to be cast by said ball throwing member at said releasing device to actuate the latter.

HARRY H. HOKE, JR.